United States Patent [19]

Tatsuno et al.

[11] Patent Number: 4,689,479
[45] Date of Patent: Aug. 25, 1987

[54] OPTICAL FOCUSSING AND TRACKING SYSTEM USING A POLARIZATION PRISM FOR DIVIDING THE REFLECTED BEAM

[75] Inventors: Kimio Tatsuno, Kokubunji; Keiji Kataoka, Kawagoe, both of Japan

[73] Assignee: Hitachi, Ltd., Tokyo, Japan

[21] Appl. No.: 681,577

[22] Filed: Dec. 14, 1984

[30] Foreign Application Priority Data

Dec. 16, 1983 [JP] Japan ............................ 58-236166

[51] Int. Cl.⁴ .................... G11B 5/09; G11B 20/22
[52] U.S. Cl. ................................... 250/201; 369/45
[58] Field of Search .............. 250/216, 201, 204; 350/616, 629, 286, 287; 369/44, 45, 46

[56] References Cited

U.S. PATENT DOCUMENTS

| 4,150,399 | 4/1979 | Boonstra | 369/45 |
| 4,555,780 | 11/1985 | Kiode | 250/201 DF |
| 4,585,933 | 4/1986 | Ando | 250/201 DF |

Primary Examiner—David C. Nelms
Assistant Examiner—William L. Oen
Attorney, Agent, or Firm—Antonelli, Terry & Wands

[57] ABSTRACT

This invention is characterized in that a modified polarization prism or a modified half prism is used therein. Since photodetectors serving at the same time for light signal detection, for automatic focussing and for tracking are disposed at opposite sides of the optical source of a semiconductor laser, a single axis optical system can be realized and it is possible to reduce the optical head in size.

15 Claims, 5 Drawing Figures

OPTICAL FOCUSSING AND TRACKING SYSTEM USING A POLARIZATION PRISM FOR DIVIDING THE REFLECTED BEAM

BACKGROUND OF THE INVENTION

This invention relates to an optical head, which is suitable for recording and play-back for a so-called optical disc, digital audio disc, video disc, etc.

A conventional recording and play-back head for the optical disc is so large, on the order of $40 \times 40 \times 30$ mm$^3$ even for that utilized in practice, and is heavy so that it prevents to reduce the volume and the weight of a whole optical device or to realize mass storage stacked optical discs. As one of the reasons therefore it is pointed out that it is difficult to realize a single axis optical system, because the light beam reflected by an optical disc is bent by means of a half prism or a polarization prism so that its optical axis is deviated by 90°, and detected by using a photodetector disposed therebehind.

In order to resolve this problem, a small type optical head has been proposed since several years, which head utilizes the effect that oscillation output is increased by the self coupling effect, when light is returned to the light emitting part of a semiconductor laser optical source, so-called SCOOP effect.

However, it is pointed out that the self coupling effect is a sort of instability of the oscillation phenomena of a semiconductor laser, and at present, for digital audio discs, video discs, etc., which have been commercialized recently, techniques for suppressing this effect as noise entering play-back signals or positioning signals are being developed. The self coupling effect for the semiconductor laser is an effect which can be observed in a structure of a resonator consisting of three mirrors, i.e. a reflecting surface of the optical disc added to two proper mirrors of the resonator in the semiconductor laser. Thus, due to fluctuations in the direction of the optical axis provoked by the rotation of the optical disc, the distance between the semiconductor laser and the optical disc fluctuates within a range of about 1 μm and consequently the semiconductor laser has a resonator structure whose stability is very bad. Consequently, there are too many problems to be resolved to reproduce signals on the optical disc by using the SCOOP effect.

SUMMARY OF THE INVENTION

The object of this invention is to provide an optical head overcoming the drawbacks mentioned above, accompanying the reduction of the optical head in size, and to realize a small type optical head.

That is, in an optical head according to this invention, photodetectors for automatic focussing or tracking are disposed in hybrid or in monolithic manner just beside a semiconductor laser optical source and reflected signal light coming from an optical disc is guided by a polarization prism and a ¼ wave plate or only by a half prism to said photodetectors.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENTS

Figure 1:
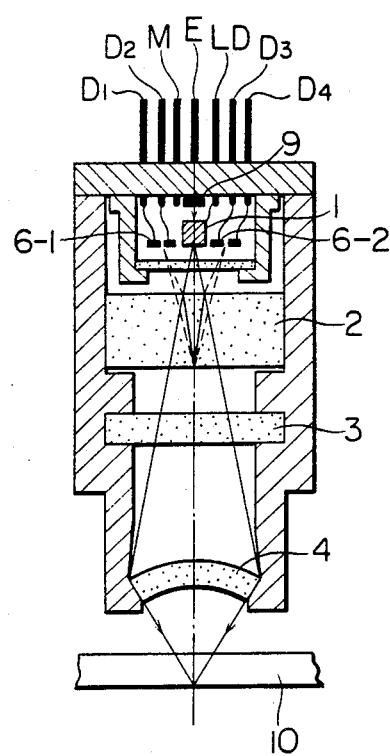
FIG. 1 is a cross-sectional view showing an example of an optical head according to this invention.

FIG. 1 shows an application example of an optical head according to this invention to the play-back for a digital audio disc, a video disc, etc. or to the recording and play-back for a DRAW (Direct Read After Write) disc. The optical disc play-back head should fulfil the conditions that when the disc fluctuates in the vertical direction, the collected beam is always well focussed in a spot on the disc and that when the track moves due to the eccentricity of the disc, the spot of the collected beam always follows the track. Hereinbelow the method for detecting the automatic focus and for tracking will be described in detail.

Figure 2A:
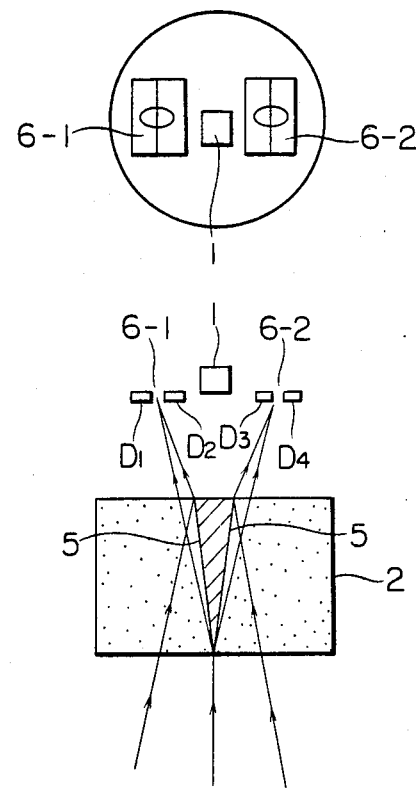
FIGS. 2A and 2B are a plan view and a cross-sectional view, respectively, in a larger scale, of the prism portion, the optical source portion and the photodetector portion indicated in FIG. 1.
Figure 2B:
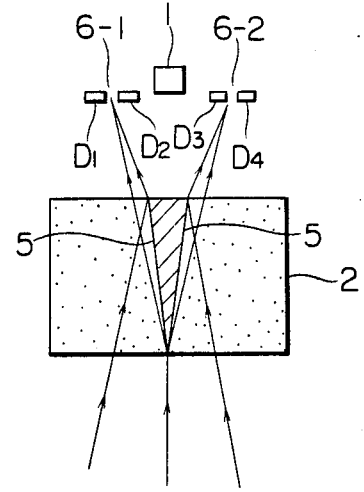
Figure 4:
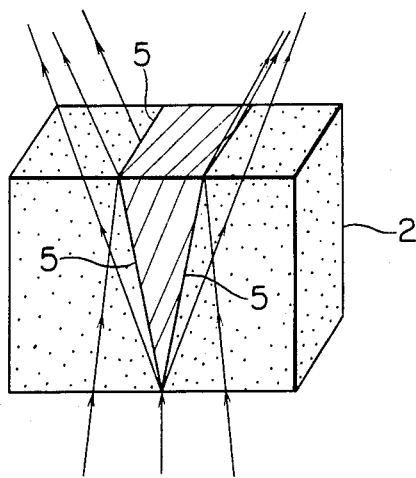
FIG. 4 is a perspective view of the prism portion used in an optical head as shown in FIG. 1 according to this invention.

A light beam leaving a semiconductor laser chip 1 passes through a modified polarization prism 2 via a window. The modified polarization prism 2 is the key element of this invention. The element has two polarizing reflecting surfaces 5, which are symmetric with respect to a plane including the optical axis. The polarizing reflecting surfaces 5 are disposed within a region near the optical axis. Consequently reflected light beams from the recording medium thus divided are reflected at the polarizing reflecting surfaces 5 with an acute angle smaller than 45° and reach photodetectors 6-1, 6-2 disposed at both the sides of the semiconductor laser 1. FIG. 4 shows the outline of the modified polarization prism. The beam coming from the semiconductor laser 1 enters the prism 2 as a p-polarized (linearly polarized) beam and passed therethrough with a transmission coefficient greater than 99%, i.e., with substantially no loss. Thereafter the beam is transformed into a circular polarized beam through a ¼ wave plate 3 and forms a spot defining the diffraction limit on an optical disc 10, which is an information recording medium, with the aid of a microlens 4. An aspheric lens, a GRIN (Gradient Refractive Index) lens, a hologram lens and the like can be used effectively as a microlens 4. For example, a spheric hologram lens is useful, because it can reduce remarkably aberration. Light reflected by the disc 10 returns to the microlens 4 and a circular polarized beam is transformed into an s-polarized beam, by passing again through the ¼ wave plate 3, which enters the modified polarization prism 2. At this moment, as indicated in FIG. 2, the s-polarized incident beam is reflected to both the sides symmetrically with respect to the plane including the optical axis and the two beams thus reflected are collected as spots, each in the form of an ellipse, on two pairs of photodetectors 6-1 and 6-2, respectively, which are disposed at both the sides of the semiconductor laser chip 1. The photodetectors 6-1 and 6-2 consist of two photosensitive elements $D_1$, $D_2$ and $D_3$, $D_4$, respectively. Since light intensity detected by each of the photosensitive elements varies differently with fluctuations of the optical disc in the vertical direction (defocus), differential signals obtained by the two photosensitive elements can be used as detection signals for focus shifts. The photodetectors 6-1 and 6-2, each of them being divided into two, are so adjusted that a conjugate image of the spot on the disc is formed on each of the dividing lines, when the incident light beam is well focussed on the optical disc. When the disc shifts in such a direction that it becomes more distant from the lens, the conjugate points shift from the photodetectors toward the prism 2. At this time, since the light beams entering the center of the prism remain unchanged, the conjugate points move along these light beams. Taking this fact into account, it is understood that light intensity on the outer photosensitive elements $D_1$ and $D_4$ of the photodetectors divided into two increases and this gives rise to difference signals. To the contrary, when the disc shifts in such a direction that it becomes closer to the lens, the conjugate points shift in such direction that it becomes more distant from the prism. In this case, light intensity on the inner photosensitive elements $D_2$ and $D_3$ of the photodetectors divided into two increases and this gives rise to difference signals. According to this principle mentioned above, denoting the light detection output voltage of the photosensitive elements $D_1$, $D_2$, $D_3$ and $D_4$ by $V(D_1)$, $V(D_2)$, $V(D_3)$ and $V(D_4)$, respectively, the focussing error signal AF can be represented for example by $$AF = V(D_1) + V(D_4) - (V(D_2) + V(D_3)),$$

and thus it is possible to know the direction and the magnitude of the shift of the disc.

On the other hand, when the spot of the collected beam deviates from the position of the track, this gives rise to unbalance in light intensity distribution. The tracking shift signals can be obtained by utilizing this unbalance. That is, since the intensity ratio of the two beams, into which the returning beam is divided by the prism 2, varies, the output signals of the photodetectors 6-1 and 6-2 disposed at both the sides of the semiconductor laser 1 are different from each other.

Consequently the tracking signal TR can be obtained for example by $$TR = V(D_1) + V(D_2) - (V(D_3) + V(D_4)).$$

The direction of the tracking shift can be also determined, depending on whether this difference signal is positive or negative.

Finally the signal on the disc is detected by the total sum $(V(D_1) + V(D_2) + V(D_3) + V(D_4))$ of light intensity entering the photodetectors 6-1 and 6-2.

In addition, a reference numeral 9 in FIG. 1 represents a photodetector for monitoring, which receives backward output light of the semiconductor laser 1, and the output of this detector can be utilized for output adjustment of the semiconductor laser 1.

Since the play-back optical system explained above uses a polarization prism and a ¼ wave plate, it has a high light utilization rate and can serve as an optical head for recording.

Figure 3:
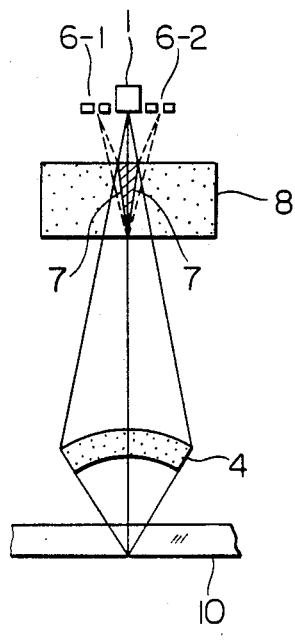
FIG. 3 is a schematic view showing another example of this invention.

FIG. 3 illustrates an application of this invention to an optical head for play-back. In this embodiment the modified polarization prism is replaced by a modified half prism having the same structure as the modified polarization prism and the ¼ wave plate is removed.

The method for automatic focusing and that for tracking are the same as those stated previously. The modified half prism 8 includes reflecting surfaces 7 having a transmission coefficient of 50%. For this optical head, although the light utilization rate is reduced to ¼ with respect to that for recording, since the polarizing property of the reflecting surfaces in the prism and also the ¼ wave plate are not needed, it is possible to realize a very cheap small type optical head.

As explained above, according to this invention, only a prism and a microlens are used as optical parts and thus it is possible to reduce remarkably the number of parts used in an optical head, which heretofore have amounted to a considerable number. Furthermore it is also possible to realize an optical head with a high reliability, which is suitable to mass production, by forming a semiconductor laser and photodetectors in hybrid in a common package.

In addition, it is possible to realize an optical head without utilizing the so-called SCOOP effect, which has the same size as that using the SCOOP effect and to reduce the size of the optical head, which heretofore has been an impediment for reduction in size of an optical disc device as a whole or for a mass storage stacked optical disc device.

What is claimed is:

1. An optical head comprising:
   an optical source including a semicondutor laser means for emitting a linearly polarized laser beam, said optical source having opposing sides;
   an optical system for focusing the linearly polarized laser beam emitted from said optical souce at a point on a recording medium;
   photodetectors disposed at the opposing sides of said optical source; and
   a beam dividing element disposed between said optical source and said optical system for passing said linearly polarized laser beam emitted from said optical source therethrough with substantially no loss so as to be directed to said optical system, and for dividing at least a part of said laser beam reflected from said recording medium into two subbeams which are directed to said photodetectors, respectively.

2. An optical head according to claim 1, wherein said beam dividing element is a half prism having two reflecting surfaces angularly disposed with each other by a predetermined angle, said reflecting surfaces being symmetrical with respect to a plane including an optical axis of said optical system and intersecting on said plane including said optical axis at respective end edges thereof facing the recording medium.

3. An optical head according to claim 1, further comprising a ¼ wavelength plate disposed between said beam dividing element and said optical system, and wherein said beam dividing element is a polarization prism having two reflecting surfaces angularly disposed with each other by a predetermined angle, said reflecting surfaces being symmetrical with respect to a plane including an optical axis of said optical system and intersecting on said plane including said optical axis at respective end edges thereof facing the recording medium.

4. An optical head according to claim 1, wherein each of said photodetectors comprises two photosensitive elements.

5. An optical head according to claim 1, wherein said optical system comprises an aspheric lens.

6. An optical head according to claim 1, wherein said optical system comprises a GRIN lens.

7. An optical head according to claim 1, wherein said optical system comprises a hologram lens.

8. An optical head according to claim 1, wherein the photodetectors are formed in hybrid or in monolithic manner together with said semiconductor laser.

9. An optical head comprising:
- an optical source including a semiconductor laser means for emitting a linearly polarized laser beam, said optical source having opposing sides;
- an optical system for focusing the linearly polarized laser beam emitted from said optical source at a point on a recording medium;
- first and second photodetectors disposed at the opposing sides of said optical source respectively, each of said first and second photodetectors having two photosensitive elements; and
- a beam dividing element disposed between said optical source and said optical system for passing said linearly polarized laser beam emitted from said optical source therethrough with substantially no loss so as to be directed to said optical system, and for dividing at least a part of said laser beam reflected from said recording medium into two sub-beams which are directed to said photodetectors, respectively, whereby a first signal representing a shift in focus is obtained from a sum of a difference between respective outputs of said two photosensitive elements of said first photodetector and another difference between respective outputs of said two photosensitive elements of said second photodetector, and a second signal representing a shift in tracking is obtained from a difference between a sum of the respective outputs of said two photosensitive elements of said first photodetector and another sum of the respective outputs of said two photosensitive elements of said second photodetector.

10. An optical head according to claim 9, wherein a playback signal of information recorded in said recording medium is obtained from a total sum of the sum of the respective outputs of said two photosensitive elements of said first photodetector and the sum of the respective outputs of said two photosensitive elements of said second photodetector.

11. An optical head according to claim 9, wherein said beam dividing element comprises two reflecting surfaces angularly disposed with each other by a predetermined angle, said reflecting surfaces being symmetrical with respect to a plane including an optical axis of said optical system and intersecting on said plane including said optical axis at respective end edges thereof facing the recording medium.

12. An optical head according to claim 10, wherein said beam dividing element comprises two reflecting surfaces angularly disposed with each other by a predetermined angle, said reflecting surfaces being symmetrical with respect to a plane including an optical axis of said optical system and intersecting on said plane including said optical axis at respective end edges thereof facing the recording medium.

13. An optical head according to claim 9, wherein said optical system comprises an aspheric lens.

14. An optical head according to claim 9, wherein said optical system comprises a GRIN lens.

15. An optical head according to claim 9, wherein said optical system comprises a hologram lens.

* * * * *